(12) United States Patent
Hsu et al.

(10) Patent No.: US 6,807,331 B2
(45) Date of Patent: Oct. 19, 2004

(54) STRUCTURES THAT CORRECT FOR THERMAL DISTORTION IN AN OPTICAL DEVICE FORMED OF THERMALLY DISSIMILAR MATERIALS

(75) Inventors: Ying Wen Hsu, Huntington Beach, CA (US); Norlito Baytan, Anaheim, CA (US); Shauhwa Cuan, Irvine, CA (US)

(73) Assignee: Newport Opticom, Inc., Newport Beach, CA (US)

( * ) Notice: Subject to any disclaimer, the term of this patent is extended or adjusted under 35 U.S.C. 154(b) by 28 days.

(21) Appl. No.: 10/072,629

(22) Filed: Feb. 8, 2002

(65) Prior Publication Data

US 2002/0146195 A1 Oct. 10, 2002

Related U.S. Application Data

(63) Continuation-in-part of application No. 09/837,829, filed on Apr. 17, 2001, now abandoned, which is a continuation-in-part of application No. 09/837,817, filed on Apr. 17, 2001.
(60) Provisional application No. 60/241,762, filed on Oct. 20, 2000, and provisional application No. 60/233,672, filed on Sep. 19, 2000.

(51) Int. Cl.$^7$ ................................................ G02B 6/26
(52) U.S. Cl. .......................................... 385/16; 385/19
(58) Field of Search ........................... 385/4, 8, 12, 16, 385/17, 18, 19, 25, 31, 39, 40, 49, 50, 52, 129, 131; 398/45; 73/514.21, 514.24, 514.36, 514.38

(56) References Cited

U.S. PATENT DOCUMENTS 5,612,815 A * 3/1997 Labeye et al. .............. 359/320
5,848,206 A * 12/1998 Labeye et al. ................ 385/22
6,169,826 B1 * 1/2001 Nishiyama et al. ........... 385/22
6,526,198 B1 * 2/2003 Wu et al. ...................... 385/18

FOREIGN PATENT DOCUMENTS

| DE | 3817035 C1 | 8/1889 |
| FR | 00 15751 A1 | 6/2002 |
| WO | WO 01/77742 A2 | 10/2001 |

OTHER PUBLICATIONS

Haronian, D., *Bottlenecks of Opto–MEMS*, In *Micro–Opto–Electro–Mechanical Systems*, SPIE vol. 4075:84–92 (2000).

* cited by examiner

*Primary Examiner*—Edward J. Glick
*Assistant Examiner*—Therese Barber
(74) *Attorney, Agent, or Firm*—Orrick Herrington & Sutcliffe, LLP

(57) ABSTRACT

Numerous novel structures and methods are presented for their ability to correct angular and offset alignment errors caused by thermal distortion of a device formed out of dissimilar materials, such as a movable platform and waveguide coupled to a fixed platform and another waveguide. A flexure connected between two platforms corrects offset alignment errors along the centerline axis of the flexure. Thermal distortion is corrected also by varying the relative size of the two platforms and the addition of slots and/or extraneous waveguides. A waveguide may be sandwiched between two matching materials, with or without an extra thermal compensation layer portion. A method uses simple processes to build a substrate with matching waveguides on each side of the substrate. Another simple method creates a suspended structure by using simple semiconductor processes.

31 Claims, 6 Drawing Sheets

STRUCTURES THAT CORRECT FOR THERMAL DISTORTION IN AN OPTICAL DEVICE FORMED OF THERMALLY DISSIMILAR MATERIALS

CROSS-REFERENCE TO RELATED APPLICATIONS

This patent application is a continuation-in-part and claims priority of the following related patent applications: (1) provisional U.S. Patent Application Serial No. 60/233,672 by Ying Wen Hsu, filed on Sep. 19, 2000 and titled "Method For Switching Optical Signals Using Microstructures;" (2) provisional U.S. Patent Application Serial No. 60/241,762 by Ying Wen Hsu, filed on Oct. 20, 2000, titled "Method for switching optical signals using microstructures;" (3) U.S. patent application Ser. No. 09/837,829 by Ying Wen Hsu, filed on Apr. 17, 2001, now abandoned and titled "Optical Switching Element Having Movable Optically Transmissive Microstructure;" (4) U.S. patent application Ser. No. 09/837,817 by Ying Wen Hsu, filed on Apr. 17, 2001 and titled "Optical Switching System That Uses Movable Microstructures To Switch Optical Signals In Three Dimensions," all patent applications of which are expressly incorporated herein by reference for all purposes.

BACKGROUND OF THE INVENTION

1. Field of the Invention

The field of the invention is structures that correct for thermal distortion in a device and more particularly, is MEMS (Micro Electro Mechanical Systems) and MOEMS (Micro Optical Electrical Mechanical Systems) structures that correct for thermal distortion in a device.

2. Background

The general class of microstructures referred to as Micro-Electro-Mechanical-Systems (MEMS) or Micro-Optical-Electrical-Mechanical-Systems (MOEMS) (hereinafter, MEMS and MOEMS are collectively referred to as "MEMS") describes microstructures that are combined with micro-optical components for use in optical applications.

In recent years, driven by popularity of the Internet, the telecommunication industry has demanded products that will help increase communication bandwidth. As the speed and number of users increase, the industry recognizes that in order to increase the throughput of the system, it is desirable to transport more data by optical means, such as through optical fibers. Although a large amount of data is already communicated through fiber optic networks, a bottleneck that occurs is at the network junctions where data is switched between fibers. Since most switches currently in use are electrical, the optical data has to be converted from an optical signal to an electrical signal before switching and after switching, back to an optical signal whenever the signal crosses over a junction or switch. A need exists, therefore, to develop optical switches that can switch light without optical-electrical-optical conversion. A number of prior art methods are capable of redirecting light without such conversion. For example, please see the above cross reference to related patent applications invented by Ying Hsu and Arthur Telkamp. These methods include use of mirrors, light guiding structures, waveguides, liquid crystal and opto-mechanical elements.

One of the main challenges in the design of light guiding structure such as waveguides in optical switching is that temperature affects waveguide alignment. A poor alignment may result in an excessive loss of light such that the data is attenuated below a useful level. In conventional applications, waveguides are deposited on silicon substrates. These substrates are thick (e.g., 400 to 500 microns) and can withstand the stress due to mismatch of the CTE (Coefficient of Thermal Expansion) of the waveguide material (typically, for example, silica or polymer) and the CTE of the silicon substrate. However, in applications where the silicon substrate is thinned to accommodate other purposes, the resulting stress due to temperature can cause a physical distortion such that the waveguides above the silicon will not align properly. The CTE for silicon is 2.3 parts per million parts per degree of Celsius, while for silica, the CTE is 0.5. Distortion of the substrate results when two materials are combined at a temperature that is different than the temperature for which the combination is used. For example, silica is typically deposited at 350° C., but the finished device is used at 23° C. or room temperature. The 327° C. difference is sufficient to exert enough thermal stress to distort a thin silicon structure. For some material, the deposition temperature is not the highest temperature of interest. Oxynitride, for example, is a material used to fabricate waveguides and requires a high temperature anneal at 1100° C. As a result, using Oxynitride on a thin substrate can result in substantial thermal distortion.

The thermally induced distortion of a physical structure due to a CTE mismatch is an old problem that the prior art has attempted to solve in a number of ways. In certain cases, thermal distortion is actually desirable. For example, a well known example of desirable thermal distortion is a "bi-metal" structure whereby two strips of dissimilar metal are bonded into a single assembly. When the finished unit is subject to a temperature change, the resulting thermal stress induced by the difference in expansion will bend the strips; the degree of bending is used as an indication of temperature. These devices are often still used today as temperature sensors in many home thermostats.

In the design of high performance mirrors for optical networks, however, the thermal distortion of a bi-metal is a serious problem that has to be overcome. These mirrors require a metal coating on top of the substrate to increase reflectivity. The result is that the finished mirror will distort when subjected to a temperature change. The solution to eliminating the distortion is accomplished generally by coating the opposite side of the substrate with the same material as the reflective coating such that an opposing stress will cancel the stress from the reflective coating, thus resulting in negligible effective distortion. This approach is referred to as a balanced stress method.

The balanced stress method has limited application to MEMS structures. The few, but widely used, surface and bulk micro-machining processes do not easily permit one to place an equal layer on the opposite side of a structure. MEMS design actually seeks to minimize the number of layers of material in order to reduce fabrication cost and increase yield. In the case of waveguides, the placement of waveguides on the opposite side of a substrate will greatly increase the complexity of the manufacturing process. Where waveguides are placed on top of thin and suspended silicon structures, the CTE mismatch can cause severe thermal distortions.

Therefore, there is a need for a microstructure that is able to maintain a precise optical alignment over a large temperature range.

SUMMARY OF THE INVENTION

The invention relates generally to novel microstructures and methods that compensate for or correct thermal distortion in an optical device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENT

The novel thermal compensation flexure described here reduces the effect of thermal distortion on structures such as optical devices. The thermal compensation flexure preferably is formed of dissimilar materials and yet maintains selective and accurate optical alignments between light guiding structures. The thermal compensation flexure may be used in any designs where a thermal distortion is induced onto a suspended structure and where an accurate alignment between a suspended structure and a stationary structure is required. For example, one such case is where an optical component such as a waveguide is mounted to a structure and the combined hybrid structure is subjected to a temperature change. In the preferred embodiment, the optical component is a waveguide or any other light guiding element which directs an optical signal along an optical path following the contour of the structure.

Figure 1:
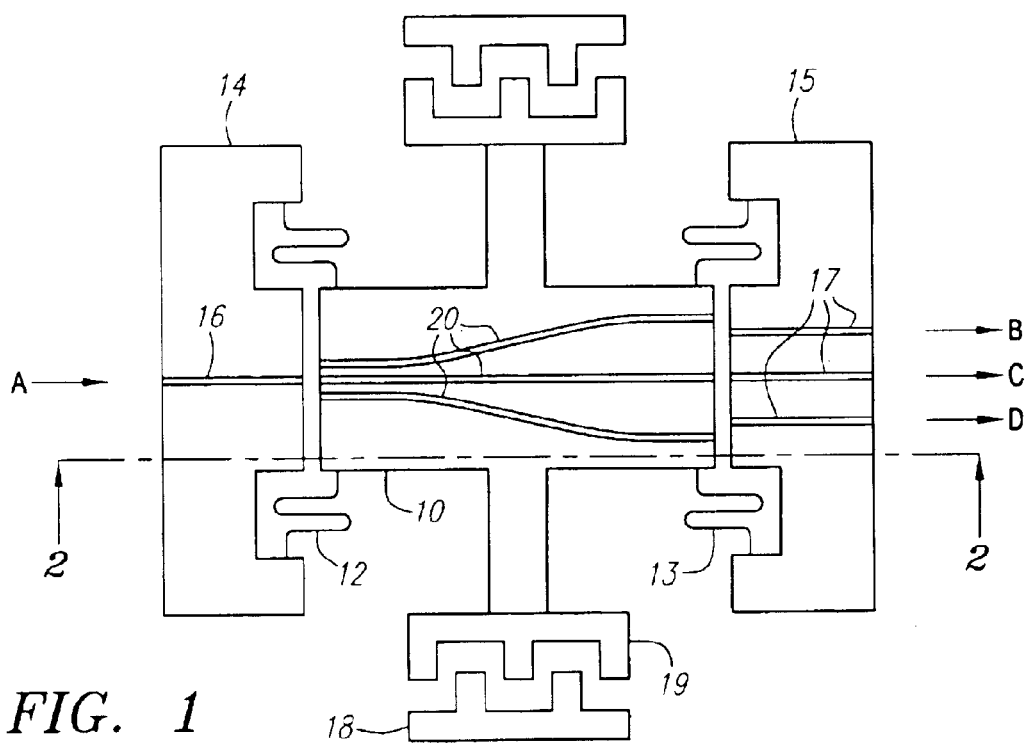
FIG. 1 is a schematic representation of an optical switch that compensates for thermal distortion.

FIG. 1 is a schematic representation of an optical switch that has a thermal compensation flexure which compensates for thermal distortion. In FIG. 1, the optical switch is capable of switching the incoming light (A) to any of the output channels B, C, D by moving the position of the suspended structure 10 relative to fixed structures 14, 15. As shown in FIG. 1, the suspended structure 10 is positioned such that an incoming optical signal from input port (A) passes through waveguide 16 on fixed structure 14 to the middle waveguide 20 on suspended structure 10, and then to the middle waveguide 17 on fixed structure 15 to output port (C). For example, if the suspended structure 10 were moved (say, downward) relative to fixed structures 14, 15, the incoming optical signal from input port (A) would pass through waveguide 16 on fixed structure 14 to the upper waveguide 20 on suspended structure 10, and then to the upper waveguide 17 on fixed structure 15 to output port (B). Likewise, if the suspended structure 10 were moved upward relative to fixed structures 14, 15, the incoming optical signal from input port (A) would pass through waveguide 16 on fixed structure 14 to the lower waveguide 20 on suspended structure 10, and then to the lower waveguide 17 on fixed structure 15 to output port (D). Of course, numerous variations to the optical switch are possible so that the optical switch may employ any number of input ports, any number of output ports, any number of fixed waveguides, any number of movable waveguides, any number of movable or suspended structures, any number of fixed structures, and any possible combination of these numbers. To move the structure 10, an electrical voltage is applied across the electrodes 18, 19. Additional details of this optical switch and its operations are disclosed in (1) provisional U.S. Patent Application Ser. No. 60/233,672 by Ying Wen Hsu, filed on Sep. 19, 2000 and titled "Method For Switching Optical Signals Using Microstructures;" (2) provisional U.S. Patent Application Ser. No. 60/241,762 by Ying Wen Hsu, filed on Oct. 20, 2000, titled "Method for switching optical signals using microstructures;" (3) U.S. patent application Ser. No. 09/837,829 by Ying Wen Hsu, filed on Apr. 17, 2001 and titled "Optical Switching Element Having Movable Optically Transmissive Microstructure;" (4) U.S. patent application Ser. No. 09/837,817 by Ying Wen Hsu, filed on Apr. 17, 2001 and titled "Optical Switching System That Uses Movable Microstructures To Switch Optical Signals In Three Dimensions," all patent applications of which have been incorporated herein by reference.

A structure 10 is suspended by thermal compensation flexures 12, 13 over substrate. In this particular embodiment, the thermal compensation flexures 12, 13 are folded springs. Although the terms "spring" and "folded spring" are used, the term "flexure" is more appropriate because the structure need not be an actual spring and can be any kind of flexible structure. Thus, for each and every embodiment and for all purposes in this disclosure, the term "spring" or "folded spring" shall be construed broadly to include any kind of flexure and the term "flexure" shall also be construed broadly to include both spring-like flexures and non-spring like flexures. The structure 10 has on its top at least one waveguide 20 that can direct light along its length. Preferably, the structure 10 has a plurality of waveguides 20. Adjacent to the suspended structure 10 are two stationary structures 14, 15 with waveguides 16, 17 respectively residing on them.

The waveguides 20 on the suspended structure 10 are typically made of silica whose CTE differs from that of the structure 10 which is preferably made of silicon. When the combined structure is brought to room temperature after depositing the silica on the structure 10 at high temperature, the resulting mismatch in CTE causes the combined structure 10, 14, 15 to bend.

Figure 2:
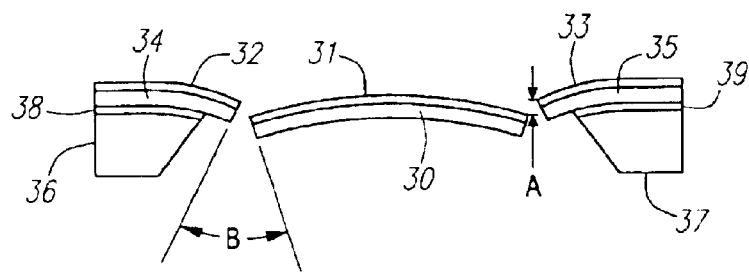
FIG. 2 is a schematic representation of the optical switch of FIG. 1 as taken along view 2A—2A and illustrates the effects of thermal distortion on the alignment of the waveguides.

FIG. 2 is a schematic representation of the optical switch of FIG. 1 as taken along view 2A—2A and depicts the optical path from input A to the middle waveguide 20 to the output waveguide C. FIG. 2 illustrates an example effect of thermal distortion on the alignment of the waveguides. Silicon structure 30 with a silica waveguide 31 formed on top of the structure 30 distorts due to thermal stress between the silica and silicon materials when the combined structure is cooled to room temperature. Since the silica waveguide 31 expands less than the silicon structure 30, the silicon structure 30 contracts a larger amount than the silica waveguide 31, thereby causing the combined structure to bend concavely. The adjacent waveguides 32, 33 placed on top of the fixed substrates 34, 35 have shorter lengths of thinned silicon extending from the substrates 36, 37 and oxides 38, 39 and hence distort less than the waveguides 31 located on the suspended structure 30. The result is a misalignment between stationary waveguides 32, 33 and suspended waveguide 31. This misalignment can be quantified as a combination of out-of-plane offset error (A) and angular error (B). The two effects induce different amounts of optical losses. These losses generally are more sensitive to offset error than to angular error.

Figure 3A:
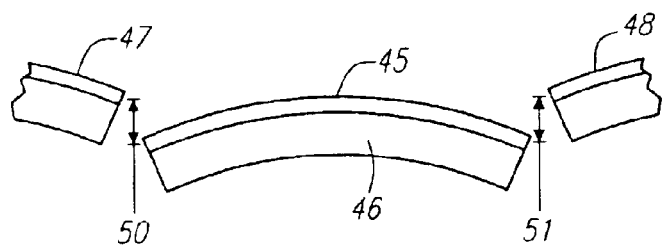
FIG. 3A illustrates an example of the effects of thermal distortion on offset errors in waveguide alignment.
Figure 3B:
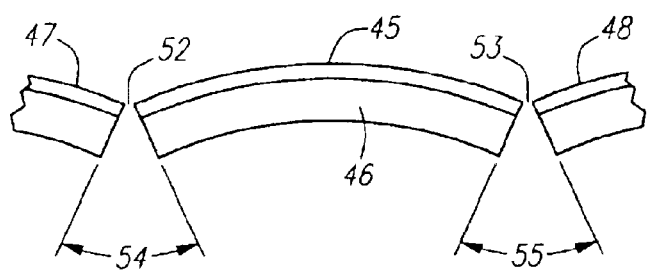
FIG. 3B illustrates the waveguides of FIG. 3A where the offset errors have been corrected.

Therefore, it is desirable to minimize both angular and offset errors caused by thermal effects. If multiple solutions are combined, each solution may affect the amount of correction independently from the other solutions. FIG. 3A illustrates a waveguide 45 attached to a suspended structure 46 where the waveguide 45 is distorted relative to adjacent fixed waveguides 47, 48 with offset errors 50, 51. FIG. 3B illustrations the situation where there is no offset error or if the offset errors were corrected. In FIG. 3B, the waveguides 47, 45 and 48 are now aligned with one another so that the offset errors 52 and 53 are nearly zero. Angular errors 54, 55 remain uncorrected in FIG. 3B.

Preferably, a thermal compensation flexure would correct for offset errors and angular errors separately. In general, higher losses are expected due to offset error than angular error. Also preferably, thermal compensation should be achieved passively. In the example embodiment which is discussed herein, the thermal compensation flexure is self-correcting over a wide range of temperatures by using a fixed compensation mechanism. Passive compensation, as opposed to active compensation, is preferable because the system is able to self-align without needing an accurate knowledge of the environment or of the material and manufacturing variables. As a result of passive compensation, the alignment between suspended waveguide 31 and fixed waveguides 32, 33 in FIG. 2 can be maintained over a range of temperature independent of manufacturing tolerances, geometry, size, temperature, and material property. Passive compensation, however, is not always the most economical solution, and often results in larger device.

Figure 4:
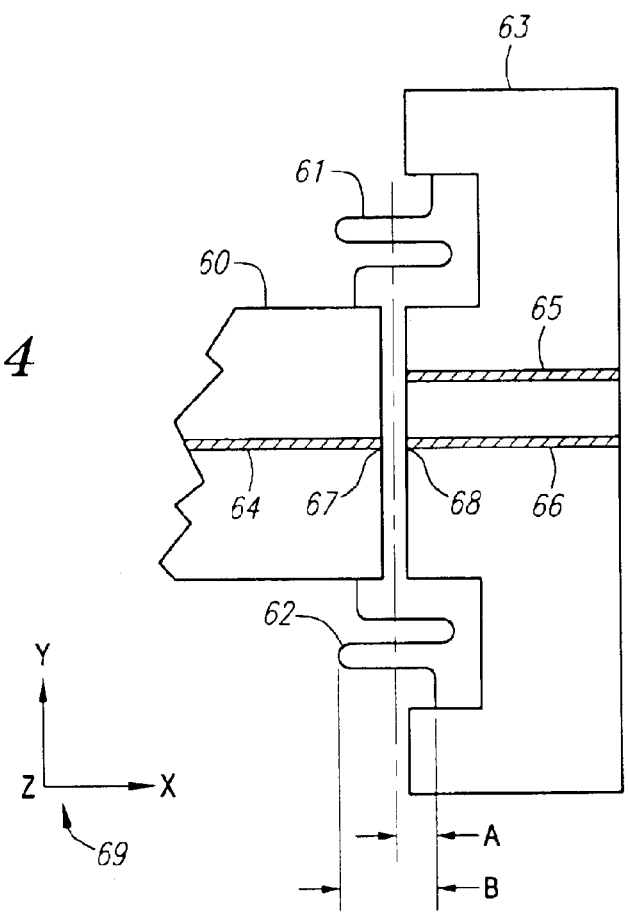
FIG. 4 is a schematic representation of the preferred embodiment of a device capable of providing zero offset errors.

FIG. 4 illustrates the preferred embodiment of a thermal compensation flexure capable of providing zero offset errors. The suspended structure 60 is supported by thermal compensation flexures 61, 62 which connect the suspended structure 60 to a stationary structure 63. In this example, the suspended structure 60 has one waveguide 64 attached to the top surface, while the stationary structure 63 has two waveguides 65, 66. The waveguides 64–66 are made preferably of silica and are processed at a high temperature, such that the suspended structure 60 will bend or curve more than the stationary structure 63. The end result, if uncorrected, is that the suspended waveguide 60 will not align properly with the selected one of stationary waveguides 65, 66. The end of the waveguides 67, 68 will separate with an offset displacement (in the z-direction 69) and an angular misalignment. However, if the ends of the waveguides 64–66 are located along a plane at or near the centerline of the thermal compensation flexures 61, 62 such that distance (A) is approximately one half of distance (B), the offset error would be zero or nearly zero. Referring to thermal compensation flexure 62, distance (A) extends from the centerline of the flexure 62 to the point of attachment of the flexure 62 to the stationary structure 63. Distance (B) extends from the point of attachment of the thermal compensation flexure 62 with the stationary structure 63 to the point of attachment of the flexure 62 with the movable structure 60.

Figure 5:
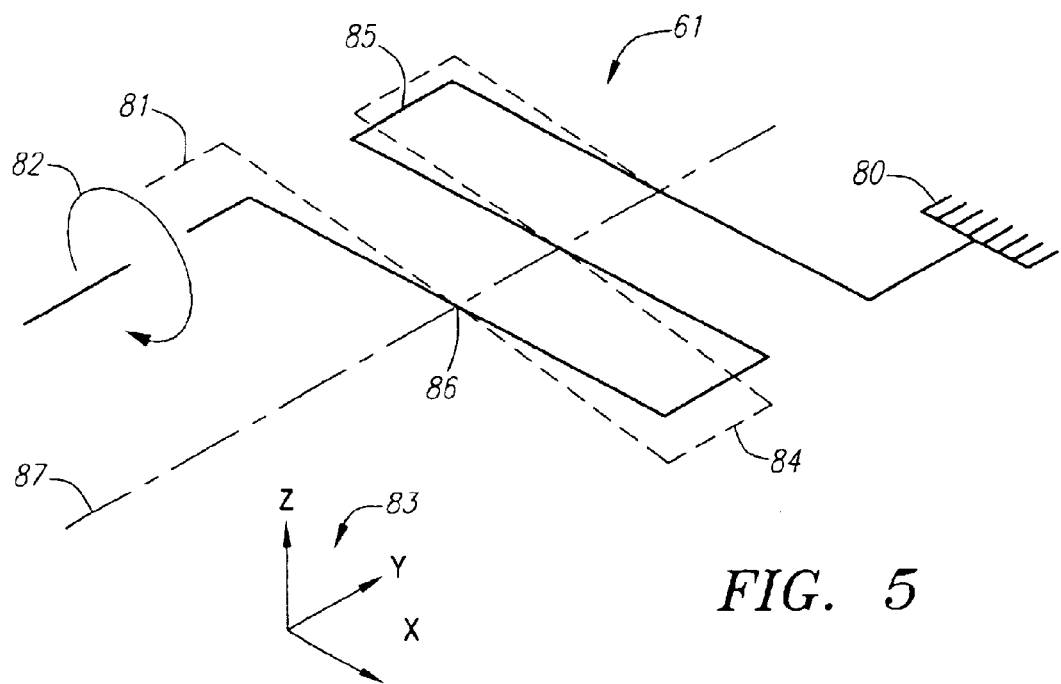
FIG. 5 is a representation of an example embodiment of an offset error correction flexure.
Figure 6A:
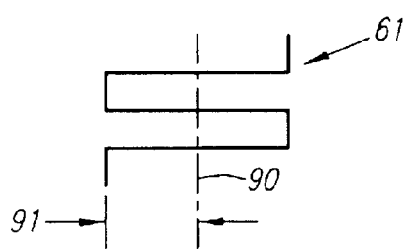
FIG. 6A is a representation of a first example embodiment of a thermal compensation flexure.

FIG. 5 is a representation of an example embodiment of an offset error correction flexure. FIG. 5 illustrates how the thermal compensation flexures 61, 62 achieve zero or near-zero displacement given an angular load. For clarity, the thermal compensation flexure 61 is represented in a schematic form with one end 80 of the flexure 61 being attached to a fixed reference and a free end 81 of the flexure 61 being attached to a suspended structure (not shown in FIG. 5). The flexure 61 operates as follows. When the suspended structure is distorted physically (say, due to a thermal load), an angular displacement 82 is imposed on the free end 81 of the flexure 61. Because of the arrangement of the thermal compensation flexure 61, the free end 81 will be displaced in the +Z direction 83 due to the angular load 82, which in turn will cause the opposite end 84 of the flexure 61 to be displaced in the opposite direction (−Z). Also, the free segment 85 of the flexure 61 also is slightly displaced in the +Z direction and finally, the fixed end 80 of the flexure 61 is not displaced because this end 80 is fixed. Looking at the centerline axis 87 of the flexure 61, the location that has zero displacement will be at or near the centerline axis 86 of the flexure 61. This remains true independent of the load, for this example, as long as there is a symmetry between the fixed end 80 and the free portions 81, 84, 85 as is further shown in FIG. 6A, where the zero displacement point 90 is located at or near the centerline axis along the length 91 of the flexure.

Figure 6B:
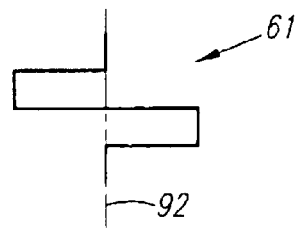
FIG. 6B is a representation of a second example embodiment of a thermal compensation flexure.
Figure 6C:
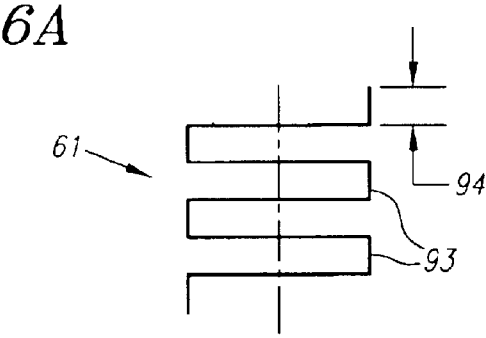
FIG. 6C is a representation of a third example embodiment of a thermal compensation flexure.

FIG. 6B is a representation of a second example embodiment of a thermal compensation flexure 61 that maintains zero displacement. The ends of the waveguides are located at or near the centerline axis 92 of the flexure 61. The thermal compensation flexure may have any number of segments or folds 93 and each segment may be of any width 94, as shown in FIGS. 6A–6E. FIG. 6C is a representation of a third example embodiment of a thermal compensation flexure 61 that maintains zero displacement. Of course, other variations are certainly permissible. For example, the folds or bends in the flexures can be squared, rounded, or of any shape, size and configuration as long as there is symmetry across the centerline axis of the flexure. In these cases, the zero deflection point will be approximately near the center point.

Figure 6D:
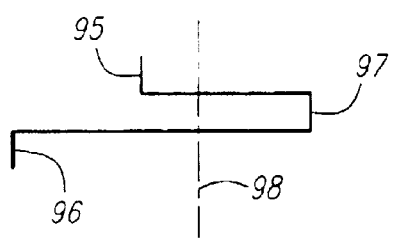
FIG. 6D is a representation of a fourth example embodiment of a thermal compensation flexure.
Figure 6E:
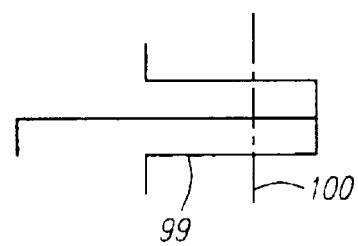
FIG. 6E is a representation of a fifth example embodiment of a thermal compensation flexure.

FIGS. 6D and 6E are representations of fourth and fifth example embodiments of a thermal compensation flexure, which demonstrate that the ends of the waveguides need not be located at or near the centerline axis of the flexure. Thus, as shown in FIGS. 6D and 6E, the ends of the waveguides are located at a distance from the centerline axis of the flexure, or in other words, symmetry is not required. For flexure designs that are asymmetrical about the centerline, the same effects are observed; however, the zero deflection point will not be at the center point, and would have to be determined analytically. For example, FIG. 6D illustrates a design that is asymmetrical, with one short and one long segment connected. The end 95 is fixed to the substrate, and the end 96 is connected to a platform subject to thermal deflection. The same working mechanism as described before applies: the end 96 would displace upward due to an applied positive moment (or down ward with negative moment). This same positive moment would cause the end 97 to displace downward and the remaining segment gradually reach zero deflection at the fixed end 95. Between the two ends 96, 97, a location 98 exists that crosses over the zero deflection point. Without symmetry, the location of the zero point deflection 98 has to be determined analytically, or by finite element modeling (FEM). This zero deflection point 98 will maintain its location over a range of temperature as the magnitude of the thermal stress changes. FIG. 6E shows a modified version of the design in FIG. 6D and illustrates that the flexure need not be a back-and-forth or "S"-shaped flexure. In this case, a partial symmetry is achieved by adding segment 99. The added segment or segments increases the stiffness of the short segments and moves the zero deflection point 100 away from the free ends. Having described the working mechanism, those of skill in the art of mechanics and flexure design would know how to make the mechanism. The use of flexures is widely used by those skilled in the art of MEMS design. Still other variations are certainly permissible. For example, the folds or bends in the flexures can be squared, rounded, or of any shape, size and configuration.

Figure 7A:
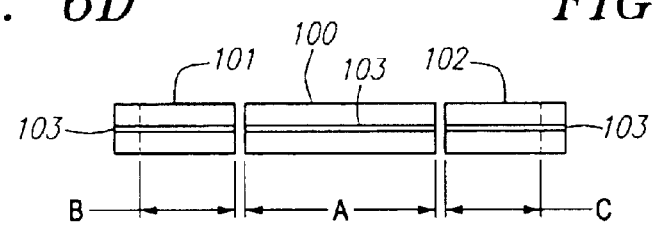
FIG. 7A is a representation of the top view of an optical device having a movable structure and two fixed structures.
Figure 7B:
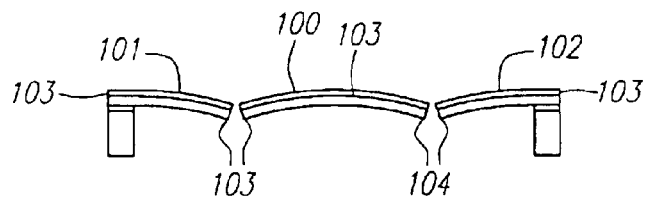
FIG. 7B is a representation of the side view of the optical device of FIG. 7A.

FIGS. 7A and 7B are representations of the top view and side view, respectively, of an optical device having a movable structure 100 and two stationary structures 101, 102. Each of these structures 100–102 are shown with a waveguide 103. These figures are useful to illustrate another technique for reducing offset errors, and like the thermal compensation flexures described above, this technique does not eliminate angular errors. Notably, the same effective free length is used for both the suspended structure 100 and the stationary structures 101, 102. In FIG. 7A, for example, the suspended structure 100 has a length A. If the two adjacent stationary structures 101, 102 have free lengths B and C which are approximately one-half of length A, the deflections of the ends of the structures 100–102 will be the same, thereby resulting in no net difference in offsets 103, 104. Since adjacent ends of the structures deflect the same amount, an optical signal passing from one structure to another see no offset displacement. This is true as long as the geometry of the suspended and fixed structures is identical. For cases where there are a different number of waveguides or other features on the structures, it is also possible to achieve no net offset difference by carefully selecting different structural stiffnesses for each component.

Figure 8:
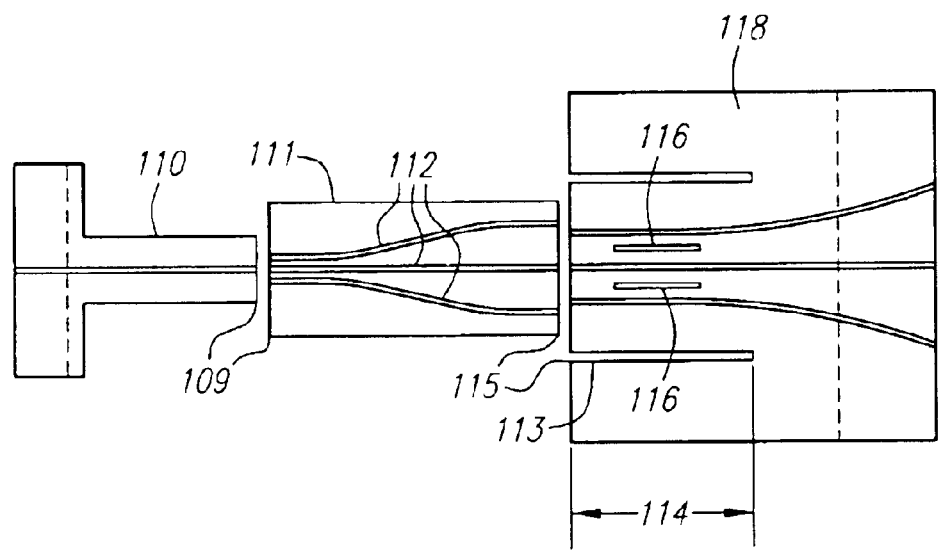
FIG. 8 is a representation of an example embodiment of an optical switch with a variety of thermal compensation features.

FIG. 8 is a representation of an example embodiment of an optical switch having a variety of thermal compensation features. A first thermal compensation feature is to adjust the widths of structures so as to compensate for thermal effects. For example, in FIG. 8, a stationary structure 110 has a narrower width than the width of the suspended structure 111. The difference in widths can be used to equalize thermal deflections at the ends 109 of the structures 110, 111. A second thermal compensation feature is to have different substructures mounted on the two structures 110, 111. If the substructures mounted on a first structure differ from those mounted on a second structure, whether in size or number or type, the thermal distortions of the first and second structures can cancel out. For example, suspended structure 111 can have three waveguides 112, while the stationary structure 110 can have only one waveguide. A third thermal compensation feature is to increase the bending of a structure by adding non-optically functioning waveguides 116, which feature is desirable if the lengths of the overhanging portions of the structure are short. Simulation tools like FEA (Finite Element Analysis) can be used to determine the exact geometries required. A fourth thermal compensation feature is to have slots 113 of a particular length 114, width, or depth. The slots 13 can be designed in configuration and positioning on the underlying structure 111 so as to reduce or cancel out the thermal distortion of the ends 115 of the structures 111, 118. Although FIG. 8 illustrates the use of all of these additional thermal compensation features, any one or any combination of them can be used as desired. Certainly, any one or any combination of these additional thermal compensation features can be added to those thermal compensation features of other embodiments.

Figure 9A:
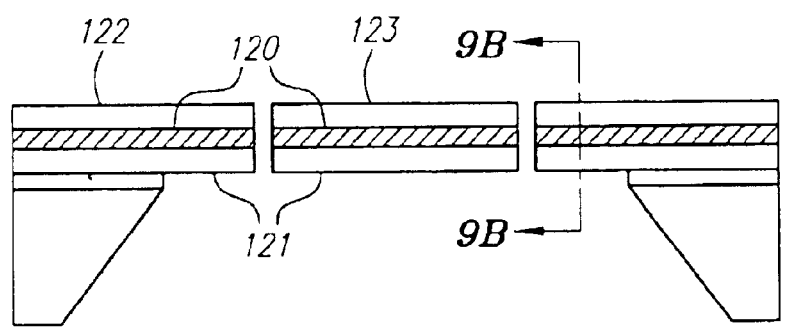
FIG. 9A is a representation of top view of an example embodiment of a thermal stress balancing multi-layer assembly.
Figure 9B:
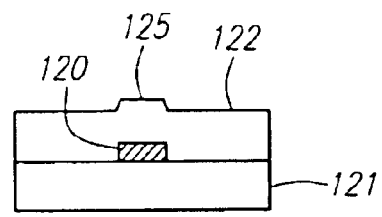
FIG. 9B is a representation of a cross-sectional view of the multi-layer assembly of FIG. 9A.

Thus far, the techniques correct for offset errors, but not angular errors. To correct for angular errors, a balanced stress approach is used. FIGS. 9A–9B are representations of the top view and cross-section view, respectively, of an example embodiment of a thermal stress balancing multi-layer assembly. In FIG. 9A, a waveguide 120 is sandwiched between a silicon substrate 121 and a silicon top layer 122, 123. FIG. 9B illustrates the cross section of substrate 121, waveguide 120 and silicon top layer 122. The silicon top layer 122 can be deposited using various methods of deposition known to those skilled in art of MEMS processing. In the sandwiched structure, there is a CTE mismatch between the silicon top layer 122 and the waveguide material 120 and another CTE mismatch between the silicon substrate 121 and the waveguide material 120. However, the sandwiched structure will balance the physical stresses caused by the CTE mismatches and will have a relatively low amount of thermal distortion. In order to ensure there is proper processing coverage, there may be a bump 125 in the silicon top layer 122 over the silica waveguide 120. The bump 125 should not create substantial stress if the silicon top layer 122 has a CTE which matches closely to the CTE of the substrate 121. Of course, the processing can be modified to eliminate the bump 125 if desired.

Figure 10A:
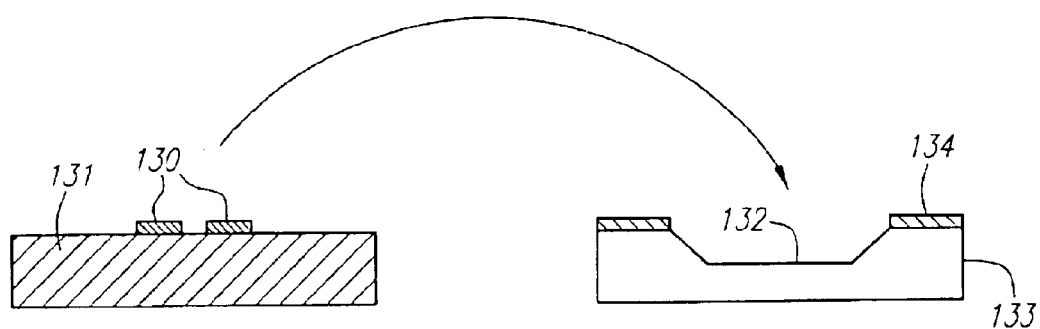
FIGS. 10A–10D are representations of an example embodiment of a process of fabricating a bottom waveguide that matches a top waveguide.
Figure 10B:
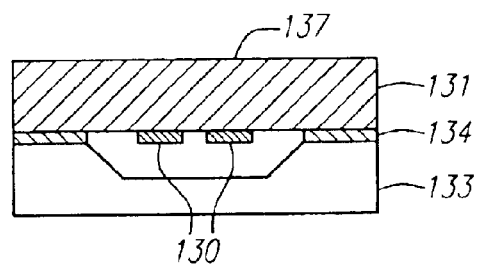
Figure 10C:
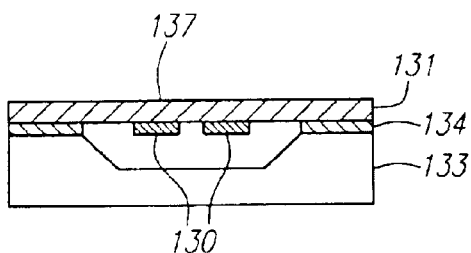
Figure 10D:
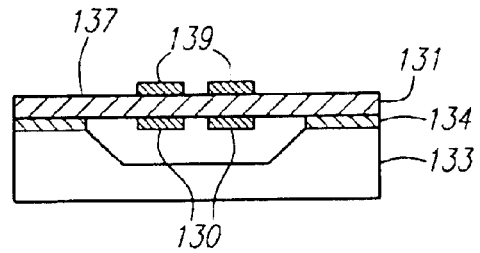

Instead of sandwiching a waveguide between two silicon layers, a preferred technique to balancing stress is to deposit a matching pattern of the waveguide material on the bottom of the silicon substrate so that there is a waveguide on both sides of the silicon substrate. Although this sounds simple in concept, it is difficult to use MEMS processes to fabricate matched waveguides on both sides of a substrate. However, a bonded approach permits one to produce matched waveguides on both sides of a substrate. FIGS. 10A–10D are representations of an example embodiment of a process of fabricating a bottom waveguide that matches a top waveguide. The main challenge is to deposit and pattern the bottom waveguide on an open and flat surface and to avoid having to pattern any waveguide inside a cavity. The process starts with depositing and patterning bottom waveguides 130 on a wafer 131. A pit 132 is created on a second wafer 133 and a dielectric layer 134 is deposited or grown on the second wafer 133. Alternatively, the dielectric layer 134 is deposited or grown on the first wafer 131. The dielectric layer 134 can be any dielectric such as an oxide. The two wafers 131, 133 are then bonded together to create an assembly 137. The assembly 137 has a top portion 131 and a bottom portion 133 which are isolated electrically from each other by the dielectric layer 134 as shown in FIG. 10B. The top portion 131 of the assembly 137 is thinned to a final desired thickness, as shown in FIG. 10C, forming a structural layer. The top waveguides 139 that match the bottom waveguides 130 are deposited and patterned on to the top portion 131. As a result, the assembly 137 has matching waveguides on both sides of a silicon structure 131. Additional detailed processing steps would be known to those familiar with MEMS processes.

Although this process of fabricating matching waveguides will completely balance the stress between waveguides and substrate, the process involves a significant number of steps which can increase the processing costs. FIG. 11 is a representation of another example embodiment of a process of fabricating a bottom waveguide that matches a top waveguide, where the process requires fewer processing steps than the process explained with respect to FIGS. 10A–10D. The shorter process uses SOI (Silicon On Insulator) as the starting wafers 131, 133. The benefit of using SOI is that the waveguides 150 can be patterned to lie on top of the silicon layer 151 and that etching of the silicon layer is made easier by having an etch stop with a buried oxide layer 152. The resulting structure can be supported on a substrate 153. A suspended or movable structure 155 can be formed by etching away the oxide 154 that binds the suspended structure 155 to the fixed structure 151. If a thin layer of oxide 156 is left un-etched, or is added subsequently onto the silicon layer of the suspended structure 155, the thermal stress resulting from this oxide layer 156 (e.g., a thermal distortion offset structure) can counteract and cancel the thermal stress from the waveguide 157.

Figure 11A:
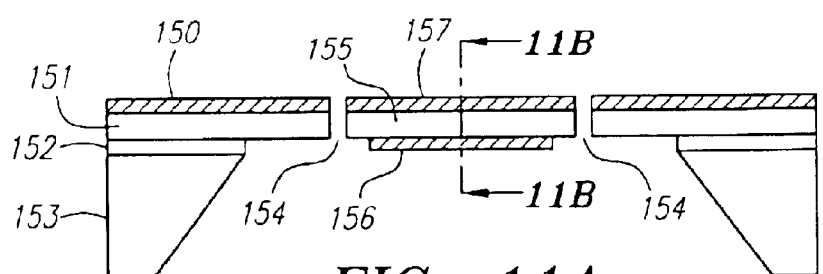
FIG. 11A is a representation of another example embodiment of a process of fabricating a bottom waveguide that matches a top waveguide, where the process requires fewer processing steps than the process explained with respect to FIGS. 10A–10D.
Figure 11B:
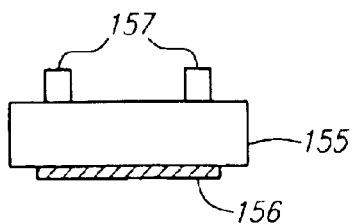
FIG. 11B is a representation of a cross-sectional view of the suspended structure 155 of FIG. 11A.

FIG. 11B is a representation of a cross-sectional view of the suspended structure 155 of FIG. 11A. Formed on the suspended structure 155 is an upper silica waveguide 150. A silica or oxide layer 156 is formed on the bottom of the suspended structure 155. By proper selection of the geometry, size and thickness of the layer 156, a simple and uniform layer 156 (e.g., a thermal distortion offset structure) can be tailored to cancel the thermal effect of the patterned waveguides 157 on the opposite side of the suspended structure 155. Beneficially, this technique uses simple geometric patterns that can be made by lithography in a cavity for balancing thermal effects. The addition of a layer 156 permits one to cancel thermal effects without requiring the formation of precisely matching waveguides. The detailed optimization of the geometry of the layer 156 required to cancel the thermal distortion of the rest of the suspended structure 155 can be achieved using FEA or other simulation tools.

Figure 12A:
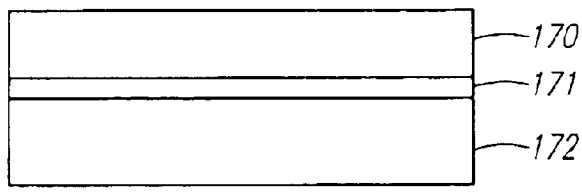
FIGS. 12A–12D are representations of yet another process for building a device in which thermal distortion effects cancel.
Figure 12B:
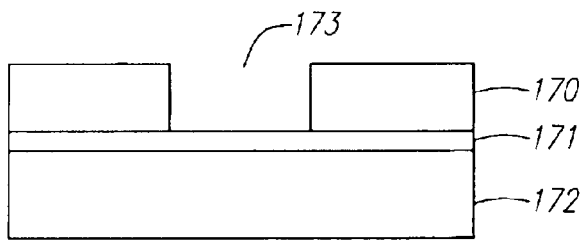
Figure 12C:
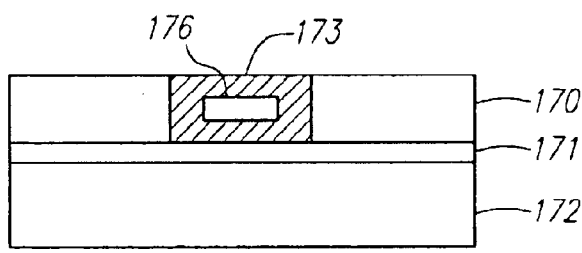
Figure 12D:
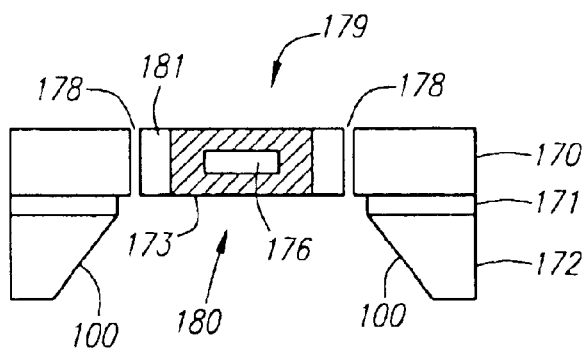

FIGS. 12A–12D are representations of yet another process for building a device of balancing thermal stresses to cancel thermal distortions. Rather than balancing thermal stress by using a top-versus-bottom approach, the thermal stress is balanced by a left-side versus right-side approach. The starting wafer substrate 172 is SOI. A structural layer 170 and a buried oxide layer 171 are formed on the substrate 172. A cavity 173 is etched into the device structural layer 170 as shown in FIG. 12B, which cavity 173 stops at the oxide layer 171. A waveguide 176 is then created and patterned inside the cavity 173 as shown in FIG. 12C. Gaps 178 are etched into the silicon structural layer 170 in order to form the suspended structure 179 as shown in FIG. 12D. The suspended structure 179 is then released from the rest of the device by etching a bottom cavity 180 into the substrate 170 to clear away the substrate 170 and oxide 171 from the suspended structure 179. The waveguide 176 is therefore supported on both left and right sides by a different material 181 (e.g., a thermal distortion offset structure) and the two sides will be balanced equally so as to cancel out thermal stresses.

Therefore, the novel microstructures and methods discussed above can reduce the angular and offset alignment errors induced by thermal distortion in a device. These techniques work not just for waveguide devices, but for any structure formed of thermally dissimilar materials. Thus, each and every embodiment can be adapted for any structure formed of thermally dissimilar materials, including non-waveguide devices.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention can be performed using different or additional process actions, or a different combination or ordering of process actions. For example, This invention is particularly suited for applications involving waveguides, but can be used on any design involving maintaining alignment of structures with dissimilar material. As a further example, each feature of one embodiment can be mixed and matched with other features shown in other embodiments. Features and processes known to those of ordinary skill in the art of MEMS design and/or processing may similarly be incorporated as desired. Additionally and obviously, features may be added or subtracted as desired. Accordingly, the invention is not to be restricted except in light of the attached claims and their equivalents.

What is claimed is:

1. An optical device comprising:
a fixed structure;
a movable structure to move relative to the fixed structure and being disposed adjacent to the fixed structure;
a first light guiding structure mounted on the fixed structure, the first light guiding structure comprising a different material than the fixed structure;
a second light guiding structure mounted on the movable structure, the second light guiding structure comprising a different material than the movable structure, each of the first and second light guiding structures having an end such that the ends of the first and second light guiding structures are aligned to propagate an optical signal between the first and second light guiding structures; and the fixed structure including a base and an overhang portion which protrudes beyond the base, the overhang portion having dimensions such that when the optical device is subject to a thermal distortion, the ends of the first and second light guiding structures maintain alignment with each other to be capable of propagating an optical signal.

2. The optical device of claim 1 wherein the dimensions of the overhang portion result in the fixed structure and the first light guiding structure being displaced under a thermal influence by the same amount that the movable structure and the second light guiding structure are displaced by the thermal influence.

3. The optical device of claim 1 wherein the first light guiding structure is a waveguide.

4. The optical device of claim 1 wherein the second light guiding structure is a waveguide.

5. The optical device of claim 3 wherein the second light guiding structure is a waveguide.

6. The optical device of claim 1 further comprising:

a second fixed structure positioned adjacent the movable structure;

a third light guiding structure mounted on the second fixed structure, the third light guiding structure comprising a different material than the second fixed structure; and the second fixed structure including a base and an overhang portion which protrudes beyond the base, the overhang portion having dimensions such that when the optical device is subject to a thermal distortion, the ends of the second and third light guiding structures are aligned with each other to be capable of propagating an optical signal.

7. The optical device of claim 1 wherein the side of the overhang portion adjacent to the movable structure is narrower than the movable structure.

8. An optical device for propagating an optical signal, the optical device comprising:

a fixed structure formed by a semiconductor process;

a movable structure formed by a semiconductor process to move relative to the fixed structure and being disposed adjacent to the fixed structure;

a first light guiding structure mounted on the fixed structure, the first light guiding structure comprising a different material than the fixed structure;

a second light guiding structure mounted on the movable structure, the second light guiding structure comprising a different material than the movable structure, each of the first and second light guiding structures having an end such that the ends of the first and second light guiding structures are aligned to propagate the optical signal between the first and second light guiding structures, the ends of the first and second light guiding structures configured to maintain alignment with each other in the presence of thermal distortion so that the first and second light guiding structures can propagate an optical signal.

9. The optical device of claim 8 further comprising a slot in the fixed or movable structure, the slot helping to maintain alignment of the ends of the first and second light guiding structures with each other in the presence of thermal distortion.

10. The optical device of claim 8 further comprising an optically extraneous waveguide mounted to the fixed or movable structure, the extraneous waveguide helping to maintain alignment of the ends of the first and second light guiding structures with each other in the presence of thermal distortion.

11. The optical device of claim 8 wherein the first light guiding structure is a waveguide.

12. The optical device of claim 11 wherein the second light guiding structure is a waveguide.

13. The optical device of claim 8 wherein the second light guiding structure is a waveguide.

14. The optical device of claim 8 wherein the ends of the first and second light guiding structures bend substantially the same amount in order to maintain alignment with each other in the presence of thermal distortion so that the first and second light guiding structures can propagate an optical signal.

15. The optical device of claim 8 wherein the movable structure has a first side and a second side, the second light guiding structure being mounted on the first side of the movable structure, and a third structure formed on the second side of the movable structure, the third structure being configured to substantially cancel the thermal distortion of the second light guiding structure.

16. The optical device of claim 15 wherein the first light guiding structure is a waveguide.

17. The optical device of claim 16 wherein the second light guiding structure is a waveguide.

18. The optical device of claim 15 wherein the second light guiding structure is a waveguide.

19. An optical device for propagating an optical signal, the optical device comprising:

a fixed structure formed by a semiconductor process;

a movable structure formed by a semiconductor process to move relative to the fixed structure and being disposed adjacent to the fixed structure;

a first light guiding structure mounted on the fixed structure, the first light guiding structure comprising a different material than the fixed structure;

a second light guiding structure mounted on the movable structure, the second light guiding structure comprising a different material than the movable structure;

a third structure comprising the same material as the movable structure and formed on the second light guiding structure so that the second light guiding structure is positioned between the movable structure and the third structure;

each of the first and second light guiding structures having an end such that the ends of the first and second light guiding structures are aligned to propagate the optical signal between the first and second light guiding structures, the ends of the first and second light guiding structures to maintain alignment with each other in the presence of thermal distortion so that the first and second light guiding structures can propagate an optical signal.

20. The optical device of claim 19 wherein the first light guiding structure is a waveguide.

21. The optical device of claim 20 wherein the second light guiding structure is a waveguide.

22. The optical device of claim 19 wherein the second light guiding structure is a waveguide.

23. The optical device of claim 19 wherein the third structure is configured to maintain the ends of the first and second light guiding structures in alignment with each other in the presence of thermal distortion.

24. An optical device comprising:

a substrate including a suspended structure that is adapted to move relative to the substrate, the suspended structure having a first surface and a second surface, the first and second surfaces being on opposite sides of the suspended structure;

a light guiding structure disposed on the first surface of the suspended structure; and a thermal distortion offset structure formed on the second surface of the suspended structure, the thermal distortion offset structure configured to counteract a thermal distortion to the first surface of the suspended structure.

25. The optical device of claim 24 wherein the light guiding structure is a first waveguide.

26. The optical device of claim 25 wherein the first and second surfaces are top and bottom surfaces of the suspended structure.

27. The optical device of claim 25 wherein the thermal distortion offset structure is made of the same material as the first waveguide.

28. The optical device of claim 27 wherein the thermal distortion offset structure includes a second waveguide.

29. The optical device of claim 28 wherein the thermal distortion offset structure is a second waveguide whose configuration differs from the configuration of the first waveguide.

30. The optical device of claim 25 wherein the first and second surfaces are side surfaces of the suspended structure, the side surfaces being generally orthogonal to the top surface of the suspended structure.

31. The optical device of claim 30 further comprising a top layer disposed on the suspended structure, the top layer covering the first waveguide.

* * * * *